(12) United States Patent  
Sablatzky et al.

(10) Patent No.: US 7,205,946 B2
(45) Date of Patent: Apr. 17, 2007

(54) ANTENNA ELEMENTS INCORPORATED INTO THE EXTERIOR STRUCTURE OF VEHICLE BODIES

(75) Inventors: Neil Sablatzky, Howell, MI (US); Dinesh C. Seksaria, Novi, MI (US)

(73) Assignee: Alcon Inc., Pittsburgh, PA (US)

( * ) Notice: Subject to any disclaimer, the term of this patent is extended or adjusted under 35 U.S.C. 154(b) by 360 days.

(21) Appl. No.: 10/980,843

(22) Filed: Nov. 3, 2004

(65) Prior Publication Data

US 2006/0090405 A1    May 4, 2006

(51) Int. Cl.  
*H01Q 1/32* (2006.01)  
*H01Q 13/10* (2006.01)

(52) U.S. Cl. ........................ 343/712; 343/767

(58) Field of Classification Search ............... 343/711, 343/712, 767  
See application file for complete search history.

(56) References Cited

U.S. PATENT DOCUMENTS

| | | | |
|---|---|---|---|
| 2,289,173 A * | 7/1942 | Best ........................ 296/107.19 |
| 3,829,862 A | 8/1974 | Young |
| 4,200,870 A | 4/1980 | Gabbitas |
| 4,216,983 A | 8/1980 | Hough et al. |
| 4,769,655 A * | 9/1988 | Nagy et al. ................ 343/712 |
| 4,848,823 A | 7/1989 | Flohr et al. |
| 5,896,107 A | 4/1999 | Huynh |
| 6,661,385 B2 * | 12/2003 | Zinsmeister et al. ........ 343/713 |
| 6,669,267 B1 | 12/2003 | Lynam et al. |

OTHER PUBLICATIONS

Smart Antennas Arrive for In-Vehicle Systems, Jack Winters, EE Times, Sep. 16, 2004; URL: http://www.eetimes.com/article/showArticle.jhtml?articleID=47212338.

* cited by examiner

*Primary Examiner*—Shih-Chao Chen  
(74) *Attorney, Agent, or Firm*—Greenberg Traurig LLP; Harry A Hild, Jr.

(57) ABSTRACT

An antenna is formed from one of the structural components of a vehicle with which the antenna is used. A preferred antenna is formed as a portion of a roof side rail of a vehicle.

17 Claims, 3 Drawing Sheets

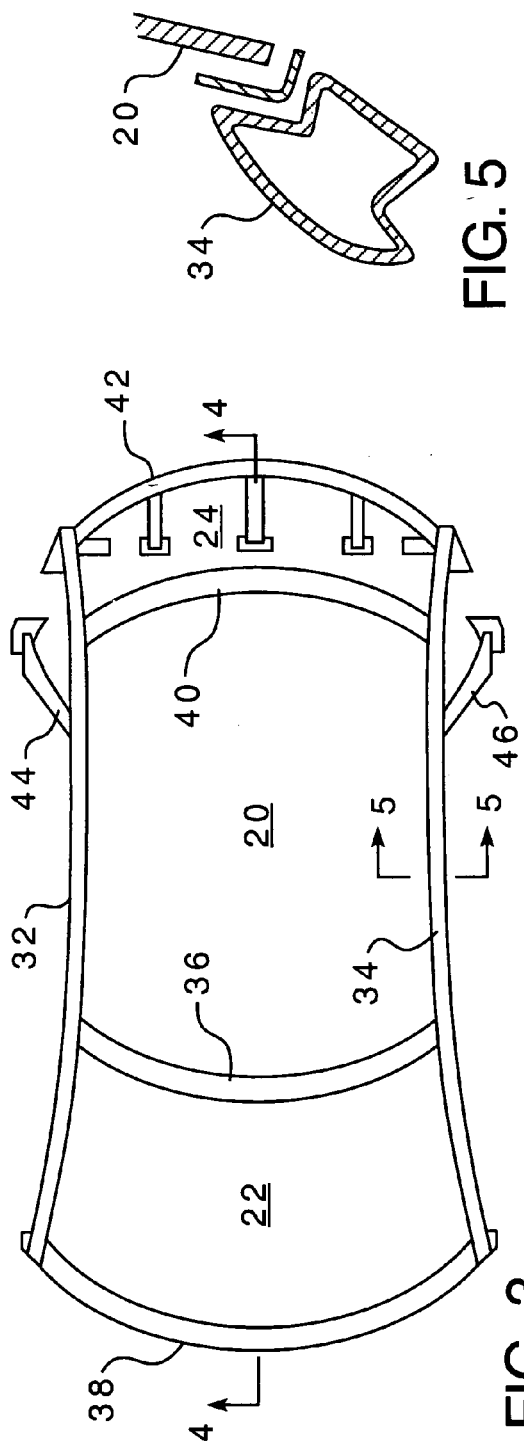
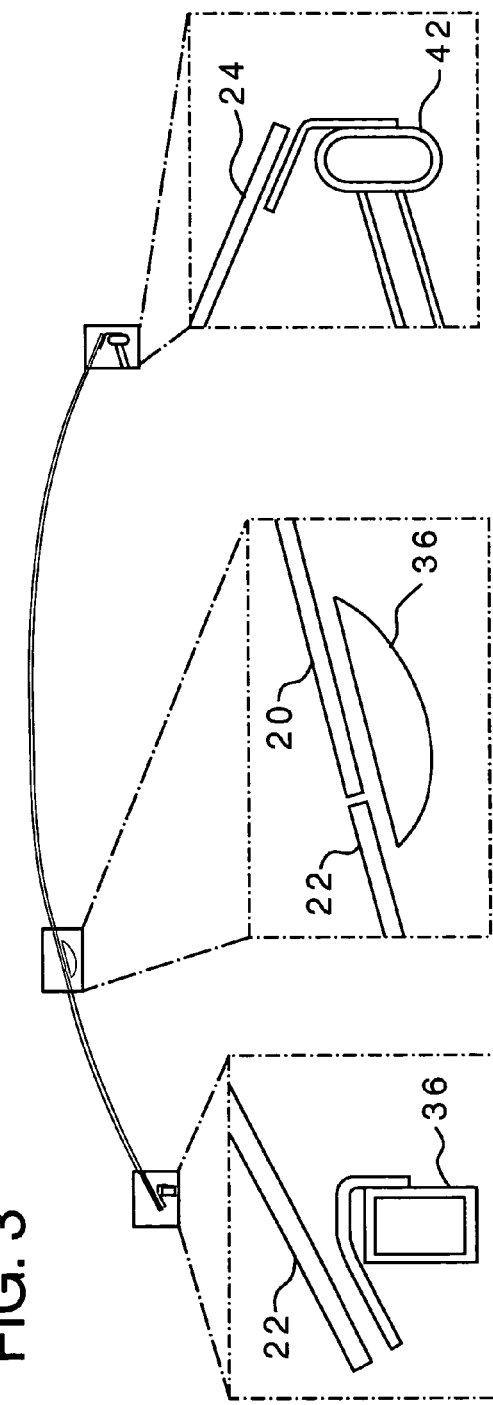

ANTENNA ELEMENTS INCORPORATED INTO THE EXTERIOR STRUCTURE OF VEHICLE BODIES

BACKGROUND OF THE INVENTION

1. Field of the Invention

The present invention relates to vehicle antennas. More specifically, the present invention provides a vehicle antenna formed as part of the support structure of the vehicle's roof.

2. Description of the Related Art

Numerous antenna structures have been proposed for use with vehicles. However, the present inventors are not aware of any presently existing antennas formed as part of the support structure of a vehicle's roof.

An example of a presently available antenna is disclosed within the U.S. Pat. No. 3,289,962, issued to D. W. Young on Aug. 13, 1974. This patent discloses an antenna structured for mounting within the front edge of an airplane wing. The waveguide antenna is made from an aluminum extrusion having a T-shaped cross section and a hollow interior. One side includes a series of holes arranged in a pair of groups disposed alternately above and below the center line of the sidewall. Upper and lower longitudinal flanges extend forward from the upper and lower edges of the sidewall defining the holes. A ridge member is slidably mounted in the stem of the T-shaped extrusion, and is operatively connected to a reciprocating yoke member having a rotary shaft with an eccentric disk having an oblong opening. Dielectric strips are mounted in front of the side having the holes, and are covered themselves with foam. The entire structure is then covered with fiberglass. The antenna itself does not form a portion of the structure of the aircraft.

U.S. Pat. No. 4,200,870, issued to C. Gabbitas on Apr. 29, 1980, discloses a microwave transmitter/receiver unit having a hollow waveguide assembly that is open at one end. The assembly is divided longitudinally into a transmitting waveguide and a receiving waveguide. A transmitting diode is mounted within the transmitting waveguide. A pair of receiving diodes mounted a number of quarter guide wavelengths apart within the receiving waveguide.

U.S. Pat. No. 5,896,107, issued to T. D. Huynh on Apr. 20, 1999 discloses an antenna system. The antenna includes a ground plate disposed between a back plate and a patch plate. The patch plate includes conductive patches spaced lengthwise along the patch plate, with each conductive patch having a length of approximately one-half wavelength. The ground plate has a dielectric body with a conductive slot layer facing the patch plate. A plurality of slots are etched into the conductive coating. Each pair of slots corresponds to one of the patches on the patch plate, and forms an X shape. The side of the ground plate facing the back plate includes a multi-strip feed network layer having a pair of feed lines and a plurality of feed probes which are capacitively coupled to the conductive patches through the slots within the slot layer. A first set of feed probes includes a plurality of pairs of feed probe members that are connected to the conductive patches through one set of polarization slide elements. The second set of feed probes include a plurality of single feed probes that are connected to the conductive patches through the other of the slide elements. Coupling through the first polarization slots causes polarization in a first direction, and coupling through the second polarization slots causes polarization in a second direction perpendicular to the first direction.

U.S. Pat. No. 6,669,267, issued to M. R. Lynam, et al. on Dec. 30, 2003, discloses an exterior accessory module for a vehicle door. The module may include an antenna for passive entry devices, a microwave antenna, GPS antenna or radio frequency antenna. While the antenna is contained within the module, it does not form a part of the structure of the vehicle, and is also located relatively low on the vehicle. The reception of an antenna is maximized by placing the antenna as high as possible on the vehicle.

None of the above antennas forms a structural component of the vehicle in which it is incorporated. The combination of an antenna and a structural component of a vehicle results in a more streamlined vehicle design. Combining an antenna with the structure of a vehicle would also result in a more durable antenna. Accordingly, there is a need for an antenna that is also a structural component of the vehicle in which it is used.

SUMMARY OF THE INVENTION

The present invention provides an antenna that is also a structural component of the vehicle within which it is used. The antenna may, for example, form part of the support structure for the roof, for example, a roof side rail. The side rail is typically formed from a metal extrusion, such as aluminum. The side rail defines a channel therein, with a slot following the same path as the channel and providing communication between the channel and the outside. The slot permits the entry of electromagnetic radiation into the channel, which then focuses the radiation to concentrate the signal onto the associated electronics.

By using the roof side rail to form the antenna, the antenna is placed as high as possible on the vehicle structure. Most communication systems utilize lower microwave frequency in the range of approximately 850 MHz to 5 GHz, and are dependent upon both satellite and land-based communication towers. Any obstacle creates attenuation of the signal, making a higher location within the vehicle structure desirable.

A barrier may be incorporated within or above the slot to resist the entrance of moisture therethrough. Such a barrier may, for example, take the form of polymeric weather stripping, which is transparent to electromagnetic radiation. Alternatively, the barrier may take the form of glass or other roof material that is transparent to electromagnetic radiation above the slot, thereby permitting the slot to form an aesthetically appealing part of the vehicle design.

Such an antenna could, of course, be incorporated into other portions of the vehicle roof. If desired, different antennas may be utilized on each of the side rails of the roof. Alternatively, multiple antennas separated by roof channel obstructions may be incorporated within the roof structure. Although a front to back orientation is illustrated as an example, a side-to-side orientation could also be used.

Combining the antenna with the roof side rail provides the antenna without adding any additional weight to the vehicle, and provides a more streamlined vehicle.

It is therefore an object of the invention to provide an antenna that forms part of the structure of the vehicle with which it is used.

It is another object of the invention to provide an antenna that provides part of the roof structure of a vehicle.

It is a further object of the invention to provide an antenna within a roof side rail of a vehicle.

It is another object of the invention to provide an antenna having a channel structured to receive radio waves and microwaves while resisting the entrance of moisture.

It is a further object of the invention to provide an antenna permitting a more streamlined vehicle design.

It is another object of the invention to provide an antenna that is as high on the vehicle as possible without protruding beyond the top of the vehicle, thereby lowering the vehicle's center of gravity.

It is a further object of the invention to provide an antenna that is less easily damaged than other presently existing antennas.

These and other objects of the invention will become more apparent through the following description and drawings.

BRIEF DESCRIPTION OF THE DRAWINGS

FIG. 3 is a top view of a roof for a vehicle incorporating the present invention.

FIG. 4 is a cross sectional view taken along the lines 4—4 in FIG. 3.

FIG. 5 is a cross sectional view taken along the lines 5—5 in FIG. 3.

Like references characters denote like elements throughout the drawings.

DETAILED DESCRIPTION OF THE PREFERRED EEMBODIMENTS

The present invention provides an antenna that is integral with a vehicle's structure.

Figure 1:
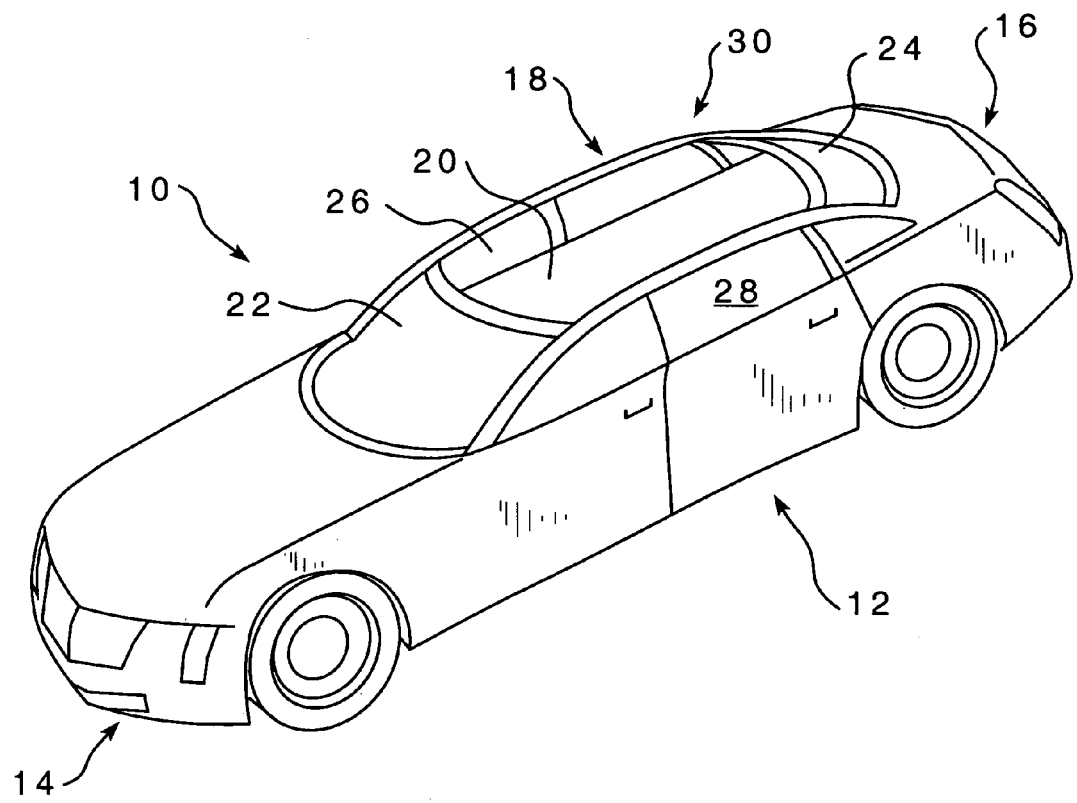
FIG. 1 is a top isometric view of a vehicle incorporating an antenna of the present invention.
Figure 2:
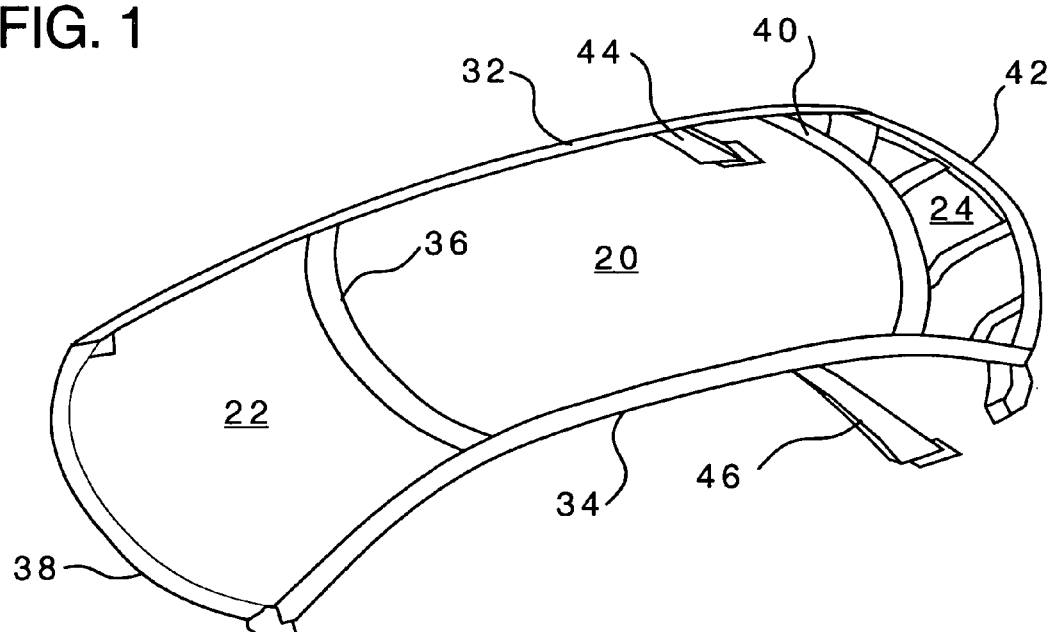
FIG. 2 is an isometric top view of a roof for a vehicle incorporating the present invention.

Referring to FIG. 1, a vehicle incorporating an antenna of the present invention is illustrated. A vehicle 10 includes a passenger compartment 12 between an engine compartment 14 and a trunk 16. The passenger compartment 12 includes a greenhouse 18, defined as the portion of the structure of the vehicle above the engine compartment 14 and trunk 16. The greenhouse 18 includes a roof 20, windshield 22, and rear window 24. The passenger compartment further includes side windows 26, 28. Referring to FIG. 2, the greenhouse 18 is supported by a support structure 30, which in the illustrated example includes a pair of side rails 32, 34, with upper 36 and lower 38 front cross members and upper 40 and lower 42 rear cross members extending there between. A pair of side support beams 44, 46 depend downward from the side rails, 32, 34. In the illustrated example, any of the side rails 32, 34, upper front cross member 36, lower front cross member 38, upper rear cross member 40, lower rear cross member 42, or side support beams 44, 46 may serve as an antenna. However, it is preferred to use one or both of the side rails 32, 34 as an antenna, thereby maximizing the available length for the antenna.

Figure 6:
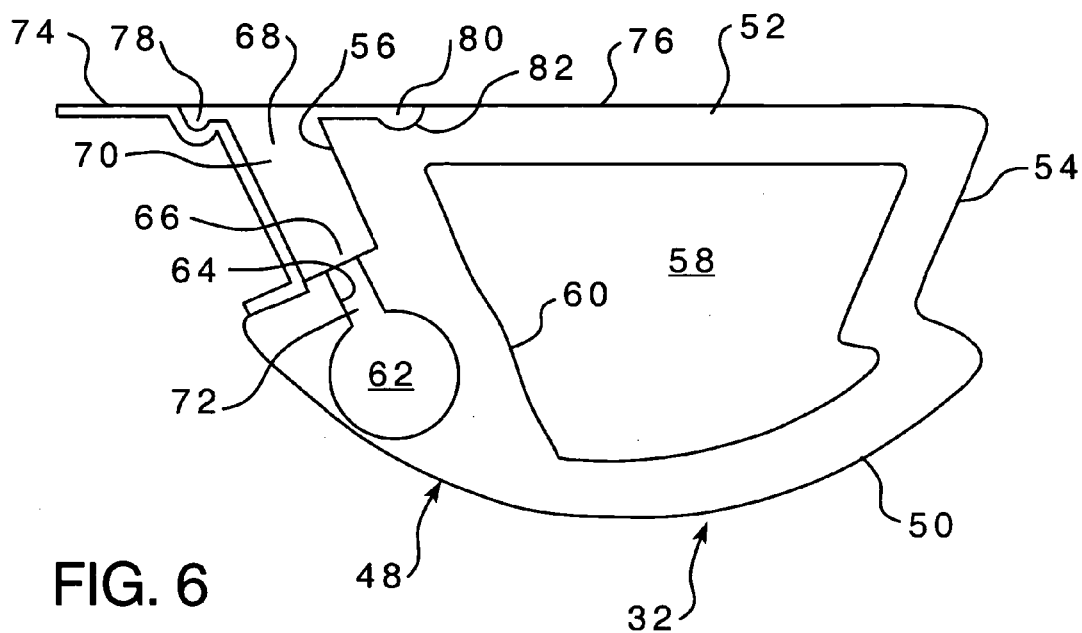
FIG. 6 is a cross sectional end view of a roof side rail incorporating an antenna of the present invention.
Figure 7:
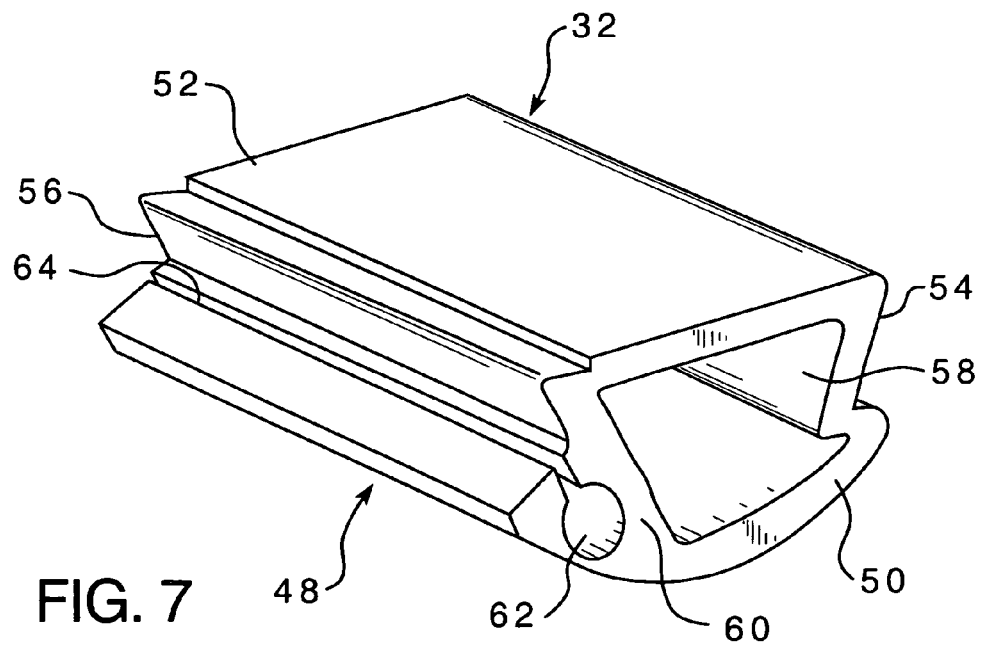
FIG. 7 is an isometric end view of a roof side rail incorporating an antenna of the present invention.

Referring to FIGS. 6–7, a side rail 32 having an antenna 48 incorporated therein is illustrated. The side rail, 32 defines an inner surface 50, an outer surface 52, a lower side edge 54 structured to interface with a vehicle door, and an upper side edge 56 structured to interface with a vehicle roof. Side rail 32 is hollow, defining a hollow center section 58 therein. The antenna structure 48 is defined between the upper side edge 56, inner surface 50, and the divider 60, which separates the antenna structure 48 from the hollow center section 58. The antenna structure 48 includes a channel 62, which preferably has a circular or substantially circular cross sectional configuration, but which may alternatively be oval shaped, elliptical or oblong. The channel 62 preferably extends substantially along the entire length of the rail 32. A slot 64 extends along the length of the channel 62, and provides communication between the channel 62 and the outside through the upper edge 56. The slot 64 therefore preferably includes an open end corresponding to the upper edge 56, so that the open end 66 of the slot 64 will face upwards when the rail 32 is incorporated into a vehicle. The orientation of the slot 64 may be adjusted to optimize electromagnetic radiation effects.

The beam 32 may be made from any of a wide variety of metals with aluminum being a preferred choice. More preferable materials include 5XXX and 6XXX aluminum alloys. Because aluminum acts as a shield in the radio frequency and microwave frequency ranges, the slot 64 permits the electromagnetic waves to enter the antenna, wherein they are focused by the channel 62 and thereby concentrated onto the electronics by means of a probe inserted into the channel.

An antenna structure 48 preferably includes a barrier for resisting the entrance of moisture into the antenna structure 48. A preferred barrier includes weather stripping 68 disposed within or above the channel 64. The weather stripping 68 may be made from polymeric material, which is transparent to electromagnetic radiation. In the illustrated embodiment, the weather stripping 68 includes a base 70 having a lower protrusion 72 structured to fit within the slot 64, and a pair of upper flanges 74, 76, each having a ridge 78, 80, respectively structured to fit within a corresponding groove 82 defined within the outer face 52 of the beam 32 or within a groove defined within the roof (not shown). Alternatively, the barrier may be made from glass or other material forming a portion of the roof, as long as such material is transparent to electromagnetic radiation. In either case, the barrier may be structured to be aesthetically pleasing as a part of the overall appearance of the vehicle.

Although a single antenna has been illustrated as in the present example, multiple antennas may be used within the vehicle. In addition to using any of the roof rails as an antenna, with each antenna being tuned to receive a different wavelength, multiple antennas separated by roof channel obstructions may be incorporated within the roof structure. Typically at least one of the antennas will be tuned to receive lower microwave frequencies in the range of approximately 850 MHz to 5 GHz. Examples of the types of communication that may utilize such an antenna include mobile telephone, global positioning services, satellite digital audio radio services, and radio. Tuning an antenna to receive such frequencies is well-known to those skilled in the art of antennas and therefore not further described herein.

The present invention therefore provides an antenna incorporated into the structure of a vehicle. By forming the channel that forms the antenna within one of the structural rails of the vehicle's roof, the need for a separate protruding antenna is eliminated and the center of gravity of the vehicle is lowered. By utilizing an open channel, having a water resistant covering that is transparent to electromagnetic radiation, radio frequency and microwave frequency waves commonly utilized by a wide variety of communication devices are permitted to enter the channel and be focused therein, while the entrance of moisture therein and the resulting possibility of corrosion are resisted. The lack of a separate protruding antenna and the incorporation of the antenna's features into the overall aesthetic appearance of the vehicle results in an overall improvement to the appearance of the vehicle.

While a specific embodiment of the invention has been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. An antenna, comprising:
a beam structured to form a portion of a vehicle exterior;
the beam defining a channel therethrough;
the beam further defining a slot following substantially the same path as the channel and in communication with the channel; and
the channel and the slot together being structured to receive communication waves selected from the group consisting of radio waves and microwaves.

2. The antenna according to claim 1, further comprising a barrier within the slot, the barrier being structured to resist passage of liquid or solid particulate matter therethrough and to be substantially transparent to electromagnetic radiation.

3. The antenna according to claim 2, wherein the barrier is made from polymeric material.

4. The antenna according to claim 1, wherein the antenna is formed within a portion of a roof of the vehicle.

5. The antenna according to claim 4, wherein the portion of the roof is a roof side rail.

6. The antenna according to claim 1, wherein the channel has a cross-section selected from the group consisting of generally circular, oval-shaped, elliptical, and oblong.

7. The antenna according to claim 1, wherein the antenna is made from a 5xxx or 6xxx series aluminum alloy.

8. The antenna according to claim 1, wherein the antenna is structured to receive signals selected from the group consisting of mobile telephone, global positioning services, satellite digital audio radio services, and radio.

9. A vehicle roof, comprising:
an antenna structured to form a portion of a support structure of the roof;
the antenna defining a channel therethrough;
the antenna further defining a slot following substantially the same path as the channel and in communication with the channel; and
the channel and the slot together being structured to receive communication waves selected from the group consisting of radio waves and microwaves.

10. The vehicle roof according to claim 9, further comprising a barrier within the slot, the barrier being structured to resist passage of water therethrough and to be substantially transparent to radio waves or microwaves.

11. The vehicle roof according to claim 10, wherein the barrier is made from polymeric.

12. The vehicle roof according to claim 9, wherein the portion of the roof is a roof side rail.

13. The vehicle roof according to claim 9, wherein the channel has a cross-section selected from the group consisting of generally circular, oval-shaped, elliptical, and oblong.

14. The vehicle roof according to claim 9, wherein the antenna is made from a 5xxx or 6xxx series aluminum alloy.

15. The vehicle roof according to claim 9, wherein the antenna is structured to receive signals selected from the group consisting of mobile telephone, global positioning services, satellite digital audio radio services, and radio.

16. The vehicle roof according to claim 9, further comprising a covering for the slot, the covering being made from a material that is transparent to electromagnetic radiation.

17. The vehicle roof according to claim 16, wherein the covering is made from glass.

* * * * *

UNITED STATES PATENT AND TRADEMARK OFFICE
CERTIFICATE OF CORRECTION

| | |
|---|---|
| PATENT NO. | : 7,205,946 B2 |
| APPLICATION NO. | : 10/980843 |
| DATED | : April 17, 2007 |
| INVENTOR(S) | : Sablatzky et al. |

It is certified that error appears in the above-identified patent and that said Letters Patent is hereby corrected as shown below:

On the Title Page, Item (73) Assignee: delete "Alcon Inc" and insert --Alcoa Inc.--.

Signed and Sealed this

Sixth Day of November, 2007

JON W. DUDAS
*Director of the United States Patent and Trademark Office*